March 5, 1963     H. W. EUKER ETAL     3,080,521
APPARATUS FOR DETECTING APOGEE IN MISSILE TRAJECTORY
Filed July 27, 1960
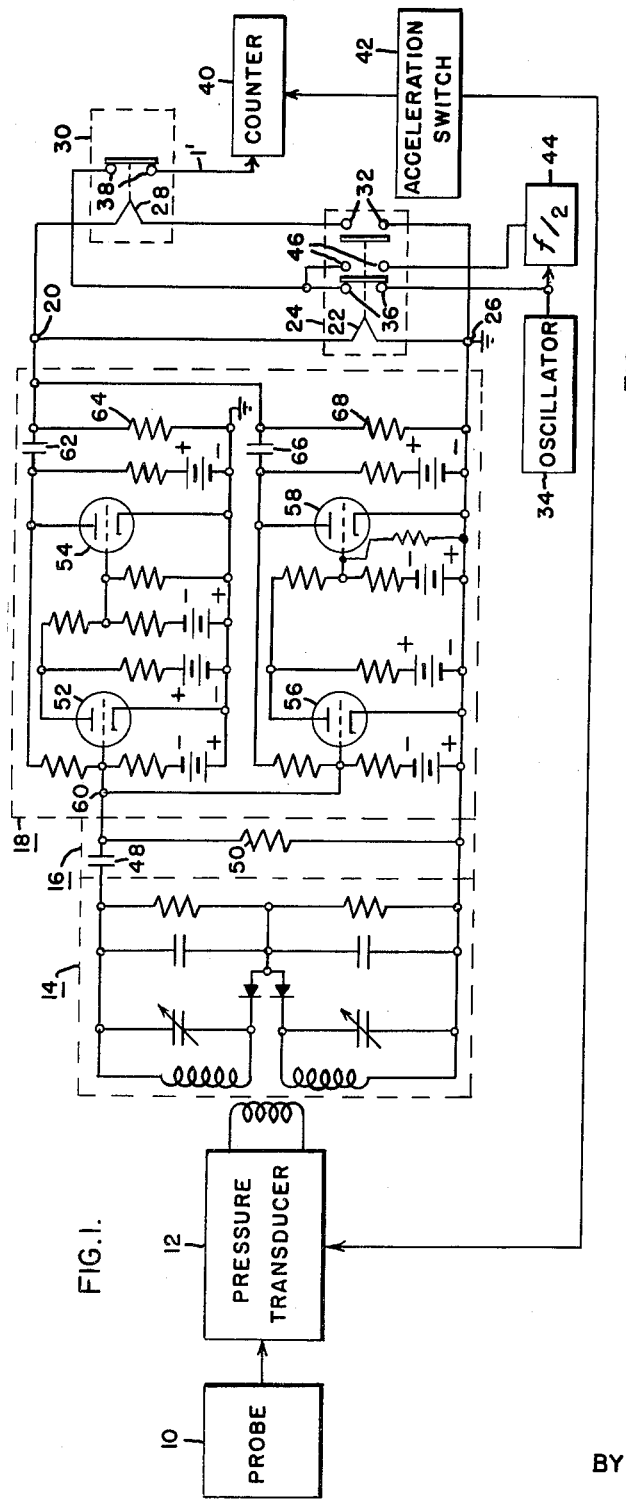
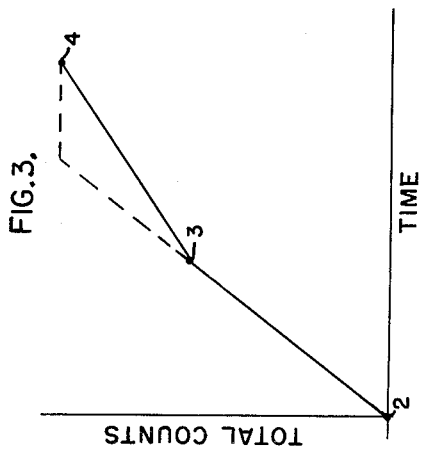
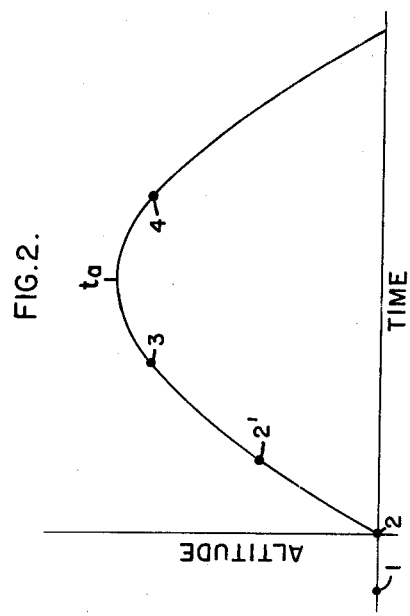
INVENTORS:
DOMENICO COCEANO,
HAROLD W. EUKER,
BY T. E. Kristofferson
THEIR ATTORNEY.

United States Patent Office 3,080,521
Patented Mar. 5, 1963

3,080,521
APPARATUS FOR DETECTING APOGEE IN MISSILE TRAJECTORY
Harold W. Euker, Jenkintown, Pa., and Domenico Coceano, Burlington, N.J., assignors to General Electric Company, a corporation of New York
Filed July 27, 1960, Ser. No. 45,643
10 Claims. (Cl. 324—68)

This invention relates to apparatus for detecting the apogee of a missile trajectory and, more particularly, to apparatus for accurately detecting apogee on the basis of pressure change at points removed from apogee.

In the prior art, apogee detection has been accomplished by such devices as switches designed to respond when decreasing pressure changes to increasing pressure. Due to the slow pressure variations at apogee causing hysteresis, the accuracy of such devices may prove to be too limited for some applications. Other devices rely upon a measurement of absolute pressure corresponding to a predetermined calculation of what pressure at apogee should be for a predicted trajectory. This technique is subject to temperature and atmospheric gradient effects as well as to deviations between actual and predicted trajectories. Accordingly, it is an object of this invention to provide an apogee detector which will respond to the actual trajectory.

Another object of the invention is to provide an apogee detector which is relatively insensitive to temperature and atmospheric gradient effects.

Still another object of the invention is to provide an apogee detector having a high sensitivity with a reduced hysteresis affect, utilizing state-of-the-art pressure transducers that can be set to operate in the vicinity of apogee without any substantial accompanying error due to the accuracy of the setting.

A further object of the invention is to provide a pressure sensitive apogee detector which can be used on trajectories that extend outside the atmosphere.

In carrying out the invention in one form thereof, a probe, pressure transducer and a discriminator are employed to provide a measurement of the change in pressure with time in the form of an output voltage. This voltage is then passed through a differentiating circuit to yield a measure of the rate of change of pressure with time. The output level of the differentiating circuit is connected to a common input of two bistable circuits with differentiated outputs, such that when the voltage representing a rate of change of pressure with time falls below a certain value, one bistable circuit is triggered yielding a first output pulse, and when the level falls below a second value representing the same rate of change of pressure in the opposite direction, the other bistable circuit is triggered yielding a second output pulse. A stabilized oscillator is connected directly to a counter through a set of normally closed contacts on a first explosive switch. The oscillator is also connected through a frequency halving circuit and a pair of normally open contacts on the first explosive switch to the counter. A set of normally closed contacts on a second explosive switch is connected between the contacts on the first explosive switch and the counter. An acceleration switch is connected to provide a signal to the counter to cause it to commence counting when an acceleration is sensed at launch. The first and second output pulses are connected to a common terminal which is connected, in turn, through the explosive element of the first explosive switch to ground and through the explosive element of the second explosive switch, and a pair of normally open contacts on the first explosive switch to ground. When the acceleration switch starts the counter it is connected directly to the oscillator until the first output pulse triggers the first explosive switch, breaking this connection and connecting the oscillator through the frequency halving circuit to the counter and connecting the explosive element in the second explosive switch to ground. Then the second output pulse actuates the second explosive switch disconnecting the oscillator entirely from the counter. The sum of counts accumulated in the counter on the basis of the full count rate represents the actual time to apogee.

The novel features which are believed to be characteristic of the invention are set forth with particularity in the appended claims. The invention itself, however, together with further objects and advantages thereof, can best be understood by reference to the following description of one embodiment taken in connection with the accompanying drawings in which—

FIGURE 1 is a diagram partly in block and partly in schematic illustrating a preferred embodiment of the invention;

FIGURE 2 is a graph of the trajectory for a typical flight showing altitude versus time and illustrates the location of the two signals generated by the apogee detector relative to true apogee; and FIGURE 3 is a graph of the total counter counts versus time.

Referring now to the drawings, in FIGURE 1 a preferred embodiment of the invention is illustrated employing a probe 10 and a pressure transducer 12 similar to those described in U.S. patent application Serial No. 862,680, filed Dec. 29, 1959, in the names of Gordon L. Fogal and Harold W. Euker, entitled "Barometric Probe System" and assigned to the assignee of the present invention. The output of pressure transducer 12 is coupled to a bidirectional discriminating circuit 14 which is coupled in turn through a differentiating circuit 16 to a pair of bistable circuits 18. The outputs of the bistable circuits 18 appears on a common terminal 20. Terminal 20 is connected through the explosive element 22 of a first explosive switch 24 to a ground terminal 26 and through an explosive element 28 on a second explosive switch 30, in series with normally open contacts 32 on explosive switch 24, to ground terminal 26.

An oscillator 34, which may be a beat frequency oscillator similar to that employed in an application Serial Number 45,726, filed July 27, 1960, and entitled "Trajectory Sensitive Time Actuating System," by Gordon L. Fogal and Harold W. Euker, filed concurrently herewith, and assigned to the same assignee as the present invention, is connected through normally closed contacts 36 on explosive switch 24 and through normally closed contacts 38 on explosive switch 30 to the input of a counter 40 which may be any type of electro-mechanical, electronic or other form of counter such as disclosed in the above referenced "Trajectory Sensitive Time Actuating System" application. An acceleration switch 42 is connected to start counter 40 and after a given delay to activate pressure transducer 12. Acceleration switch 42 may also be of the type disclosed in the "Trajectory Sensitive Time Actuating System" application referenced above with an associated delay circuit. The output of oscillator 34 is also connected through a frequency halving circuit 44, such as a flip-flop circuit, and through normally open contacts 46 on explosive switch 24 and normally closed contacts 38 on explosive switch 30 to the input of counter 40.

The operation of the circuit of FIGURE 1 is as follows: Probe 10, pressure transducer 12 and discriminator 14 generate a voltage signal representative of the variation of pressure with time. (I. e., pressure varies with time because the missile altitude varies with time during the trajectory.) The oscillator contained in pressure transducer 12 is tuned over a wide band to yield a more gradual variation of voltage with pressure than the sharp spike that was desired in the above referenced application on the "Barometric Probe System."

Discriminator 14 is a standard form of bidirectional discriminator and thus its structure and operation will not be described in detail. One operable form of bidirectional discriminator is illustrated in FIGURE 1. The output of discriminator 14 is differentiated by differentiating network 16, here shown to employ a capacitor 48 and resistor 50. Again, it is obvious that many other differentiating circuits can be employed. The output of the differentiating circuit 16 is then representative of the direction and rate of change of pressure with time. This output could be obtained in a variety of ways such as by designing a bellows in the pressure transducer 12 to make it a rate device.

The bistable circuits 18 employ tubes 52 and 54 in a first bistable circuit and tubes 56 and 58 in a second bistable circuit. Again, the bistable networks themselves are well known and will not be desecribed further. They may be biased as illustrated in FIGURE 1. Transistorized circuits, magnetic circuits and other types of bistable circuits may also be employed. The output of differentiating circuit 16 is connected through a common terminal 60 to the grids of tubes 52 and 56 which are biased to be normally conducting.

At a preselected rate of change of pressure with time during the ascending portion of the trajectory represented by a given output from circuit 16, the voltage on terminal 60 reaches a level sufficient to cut off tube 52, causing tube 54 to conduct in turn. The output of tube 54 is then differentiated by capacitor 62 and resistor 64, which causes a first pulse to occur at terminal 20. The voltage on terminal 60 then continues to swing until the same rate of change of pressure with time in the opposite direction is detected during descent. Tube 56 is so biased that this output voltage on terminal 60 will cut it off causing tube 58 to conduct. The output of tube 58 is then differentiated by capacitor 66 and resistor 68 which causes a second output pulse to occur on terminal 20.

The timing of these pulses is illustrated in FIGURE 2, which is a graph of altitude versus time for a given trajectory. At point 1 in FIGURE 2, the oscillators of the circuit of FIGURE 1 are actuated to allow their frequencies to stabilize. At point 2 the missile is fired and acceleration switch 42 causes the counter 40 to commence counting. Counter 40 is then connected directly to oscillator 34 through contacts 36 and 38, and counts at the rate determined thereby. At point 2' the pressure transducer 12 is activated after a given time delay to prevent detector outputs caused by pressure transient effects at launch (i.e., passing through the transonic speed range). At point 3 on FIGURE 2 in the ascending portion of the trajectory, the rate of change of pressure with time reaches the value resulting in the cut off of tube 52, causing the first output pulse to appear on terminal 20. This pulse goes through explosive element 22 to ground actuating explosive switch 24, opening contacts 36 and closing contacts 32 and 46. Oscillator 34 is then connected through frequency halving circuit 44, contacts 46 and 38 to counter 40, causing counter 40 to count at one-half the rate at which it had previously been counting.

Since normally open contacts 32 have been closed, explosive element 28 of explosive switch 30 is now connected between terminal 20 and ground terminal 26. Counter 40 continues to count at one-half the rate until point 4 of FIGURE 2 is reached. Point 4 is on the descending portion of the trajectory at approximately the same altitude as point 3, and represents the equivalent rate of change of pressure with time, but in the opposite direction to that at point 3. At point 4 the voltage on terminal 60 cuts off tube 56 causing the second pulse to appear at terminal 20. The second pulse at terminal 20 then actuates explosive element 28 of explosive switch 30, which opens contacts 38, disconnecting counter 40 entirely from oscillator 34 causing it to cease counting.

The total count on counter 40 is now representative of the time from launch to apogee or the point $t_a$ on FIGURE 2. This count is illustrated further in FIGURE 3 which is a graph of the total count versus time. The points on FIGURE 3 are identical to those having similar numerals on FIGURE 2. Between the points 2 and 3 the counter counts at the full rate determined by oscillator 34. Between points 3 and 4 the counter counts at one-half the rate. Since it is counting at one-half the rate between points 3 and 4, which represents twice the time from point 3 to apogee, the total count between points 3 and 4 represents the count at the original oscillator rate between point 3 and apogee, as illustrated.

The reason for implementing the system in the manner described above is that at the points 3 and 4 the change of pressure with time or the rate of change of pressure with time is more rapid than at apogee where it is changing around zero. Therefore, the pressure detectors and associated measuring equipment do not require the same degree of sensitivity and higher accuracies can be obtained using any given detecting equipment. This feature also permits the system to be used outside the atmosphere as long as the biasing and preselected rates are taken so as to place the points 3 and 4 within the atmosphere. Between points 3 and 4 at the top of the trajectory, the geometry has a maximum symmetry permitting the assumption of symmetry necessary for an accurate determination of apogee time.

The embodiment described above is obviously only one way of implementing the invention using specified components. Equivalent components may obviously be substituted for those described and still be within the limits of the invention. It should, therefore, be understood that there is no intention to limit the invention to the specified components and that it is intended by the appended claims to cover all variations of both components and component arrangement that fall within the true spirit and scope of the invention.

What is claimed as new and desired to be secured by Letters Patent of the United States is:

1. An apogee detector comprising means for providing a signal representing a function of pressure, a counter, a stable frequency source, a frequency halving circuit, switching means connecting said source to said counter and adapted to connect said source through said halving circuit to said counter, means for starting said counter at the beginning of a trajectory, means connecting said signal to said switching means for disconnecting said source from said counter and connecting said source through said halving circuit to said counter in response to a preselected value of said signal, and means actuated by a repetition of said preselected value of said signal for indicating that the desired total count to apogee has been achieved.

2. An apogee detector comprising means for providing a signal representing a function of pressure, a counter, a stable frequency source, a frequency halving circuit, switching means connecting said source to said counter and adapted to connect said source through said halving circuit to said counter, means for starting said counter at the beginning of a trajectory, and means connecting said signal to said switching means for disconnecting said source from said counter and connecting said source through said halving circuit to said counter in response to a preselected value of said signal and for completely disconnecting said counter from said source in response to a second preselected value of said signal.

3. An apogee detector comprising detecting means for providing a signal representing the rate of change of pressure with time, a counter, a stable frequency source, a frequency halving circuit, switching means connecting said source and said counter and adapted to connect said source through said halving circuit to said counter, means for starting said counter at the beginning of a trajectory, means connecting said signal to said switching means for disconnecting said source from said counter and connecting said source through said halving circuit to said counter in response to a preselected level of said signal, and means actuated by a repetition of said preselected level of said signal for indicating that the desired total count to apogee has been achieved.

4. An apogee detector comprising detecting means for providing a signal representing the rate of change of pressure with time, a counter, a stable frequency source, a frequency halving circuit, switching means connecting said source and said counter and adapted to connect said source through said halving circuit to said counter, means for starting said counter at the beginning of a trajectory, and means connecting said signal to said switching means for disconnecting said source from said counter and connecting said source through said halving circuit to said counter in response to a preselected level of said signal and for completely disconnecting said counter from said source in response to a second preselected level of said signal.

5. An apogee detector comprising detecting means for providing two pulses representing equivalent rates of change of pressure with time during the ascending and descending portions of a trajectory, a counter, a stable frequency source, a frequency halving circuit, switching means connecting said source to said counter and adapted to connect said source through said frequency halving circuit to said counter, means for starting said counter at the beginning of a trajectory, means connecting said detecting means to said switching means for disconnecting said source from said counter and connecting said source through said halving circuit to said counter in response to the first of said pulses, and means actuated in response to the second of said pulses for indicating that the desired total count to apogee has been achieved.

6. An apogee detector comprising detecting means for providing two pulses representing equivalent rates of change of pressure with time during the ascending and descending portions of a trajectory, a counter, a stable frequency source, a frequency halving circuit, switching means connecting said source to said counter and adapted to connect said source through said frequency halving circuit to said counter, means for starting said counter at the beginning of a trajectory, and means connecting said detecting means to said switching means for disconnecting said source from said counter and connecting said source through said halving circuit to said counter in response to the first of said pulses and for completely disconnecting said source from said counter in response to the second of said pulses.

7. An apogee detector comprising a pressure probe, a pressure transducer connected to said probe for providing a first signal representing the variation of pressure with time, a bidirectional discriminating circuit connected to the output of said transducer to transform said first signal into a second signal in the form of a voltage representing both the variation and direction of change of pressure with time, a differentiating circuit connected to the output of said discriminating circuit for providing a third signal representing the rate and direction of change of pressure with time, a counter, a stable frequency source, a frequency halving circuit, switching means connecting said source and said counter and adapted to connect said source through said halving circuit to said counter, means for starting said counter at the beginning of a trajectory, means connecting said third signal to said switching means for disconnecting said source from said counter and connecting said source through said halving circuit to said counter in response to a preselected level of said third signal representing the rate of change of pressure at a point on the trajectory prior to apogee, and means actuated in response to a repetition of said preselected level of said third signal for indicating that the desired total count to apogee has been achieved.

8. An apogee detector comprising a pressure probe, a pressure transducer connected to said probe for providing a first signal representing the variation of pressure with time, a bidirectional discriminating circuit connected to the output of said transducer to transform said first signal into a second signal in the form of a voltage representing both the variation and direction of change of pressure with time, a differentiating circuit connected to the output of said discriminating circuit for providing a third signal representing the rate and direction of change of pressure with time, a counter, a stable frequency source, a frequency halving circuit, switching means connecting said source and said counter and adapted to connect said source through said halving circuit to said counter, means for starting said counter at the beginning of said trajectory, and means connecting said third signal to said switching means for disconnecting said source from said counter and connecting said source through said halving circuit to said counter in response to a preselected level of said third signal representing the rate of change of pressure at a point on the trajectory prior to apogee and for disconnecting said counter entirely from said source in response to a second preselected level of said third signal representing the same rate of change of pressure in the opposite direction at a point subsequent to apogee.

9. An apogee detector comprising a static pressure probe, a pressure transducer connected to said probe for providing a first signal representing the variation of pressure with time, a bidirectional discriminating circuit connected to the output of said transducer to transform said first signal into a second signal in the form of a voltage representing both the variation and direction of change of pressure with time, a first differentiating circuit connected to the output of said discriminating circuit for providing a third signal representing the rate and direction of change of pressure with time, first and second bistable circuits connected to the output of said differentiating circuit, said first bistable circuit being biased such that its normally conducting element will be cut off by a first level of said third signal representing a rate of change of pressure at a point on the trajectory prior to apogee, a second differentiating circuit connected to the output of the normally non-conducting element of said first bistable circuit for providing a first pulse when its normally non-conducting element is turned on in response to turning off the normally conducting element of said first bistable circuit, said second bistable circuit being biased such that its normally conducting element will be cut off by a second level of said third signal representing the same rate of change of pressure in the opposite direction at a point subsequent to apogee, a third differentiating circuit connected to the output of the normally non-conducting element in said second bistable circuit for providing a second pulse when its normally non-conducting element is turned on in response to turning off the normally conducting element of said second bistable circuit, a counter, a stable frequency source, a frequency halving circuit, switching means connecting said source and said counter and adapted to connect said source through said halving circuit to said counter, an acceleration switch having an internal delay means, said acceleration switch being connected directly to said counter to cause it to commence counting on actuation of said acceleration switch, said acceleration switch being also connected through said internal delay means to said transducer to connect said transducer to its output after the delay provided by said delay means, means connecting said pulses to said switching means for disconnecting said source from said counter and connecting said source through said halving circuit to said counter in response to said first pulse, and means actuated in response to said second pulse for indicating that the desired total count to apogee has been achieved.

10. An apogee detector comprising a static pressure probe, a pressure transducer connected to said probe for providing a first signal representing the variation of pressure with time, a bidirectional discriminating circuit connected to the output of said transducer to transform said first signal into a second signal in the form of a voltage representing both the variation and direction of change of pressure with time, a first differentiating circuit connected to the output of said discriminating circuit for providing a third signal representing the rate and direction of change of pressure with time, first and second bistable circuits connected to the output of said differentiating circuit, said first bistable circuit being biased such that its normally conducting element will be cut off by a first level of said third signal representing a rate of change of pressure at a point on the trajectory prior to apogee, a second differentiating circuit connected to the output of the normally non-conducting element of said first bistable circuit for providing a first pulse when its normally non-conducting element is turned on in response to turning off the normally conducting element of said first bistable circuit, said second bistable circuit being biased such that its normally conducting element will be cut off by a second level of said third signal representing the same rate of change of pressure in the opposite direction at a point subsequent to apogee, a third differentiating circuit connected to the output of the normally non-conducting element in said second bistable circuit for providing a second pulse when its normally non-conducting element is turned on in response to turning off the normally conducting element of said second bistable circuit, a counter, a stable frequency source, a frequency halving circuit, switching means connecting said source and said counter and adapted to connect said source through said halving circuit to said counter, an acceleration switch having an internal delay means, said acceleration switch being connected directly to said counter to cause it to commence counting on actuation of said aceleration switch, said acceleration switch being also connected through said internal delay means to said transducer to connect said transducer to its output after the delay provided by said delay means, and means connecting said pulses to said switching means for disconnecting said source from said counter and connecting said source through said halving circuit to said counter in response to said first pulse and for disconnecting said counter entirely from said source in response to said second pulse.

References Cited in the file of this patent
UNITED STATES PATENTS

| | | |
|---|---|---|
| 2,940,392 | Loren et al. | June 14, 1960 |
| 2,942,233 | Lear | June 21, 1960 |